Nov. 13, 1923.　　　W. L. CARNEGIE　　　1,473,669
PLY WOOD WHEEL
Filed Oct. 27, 1919
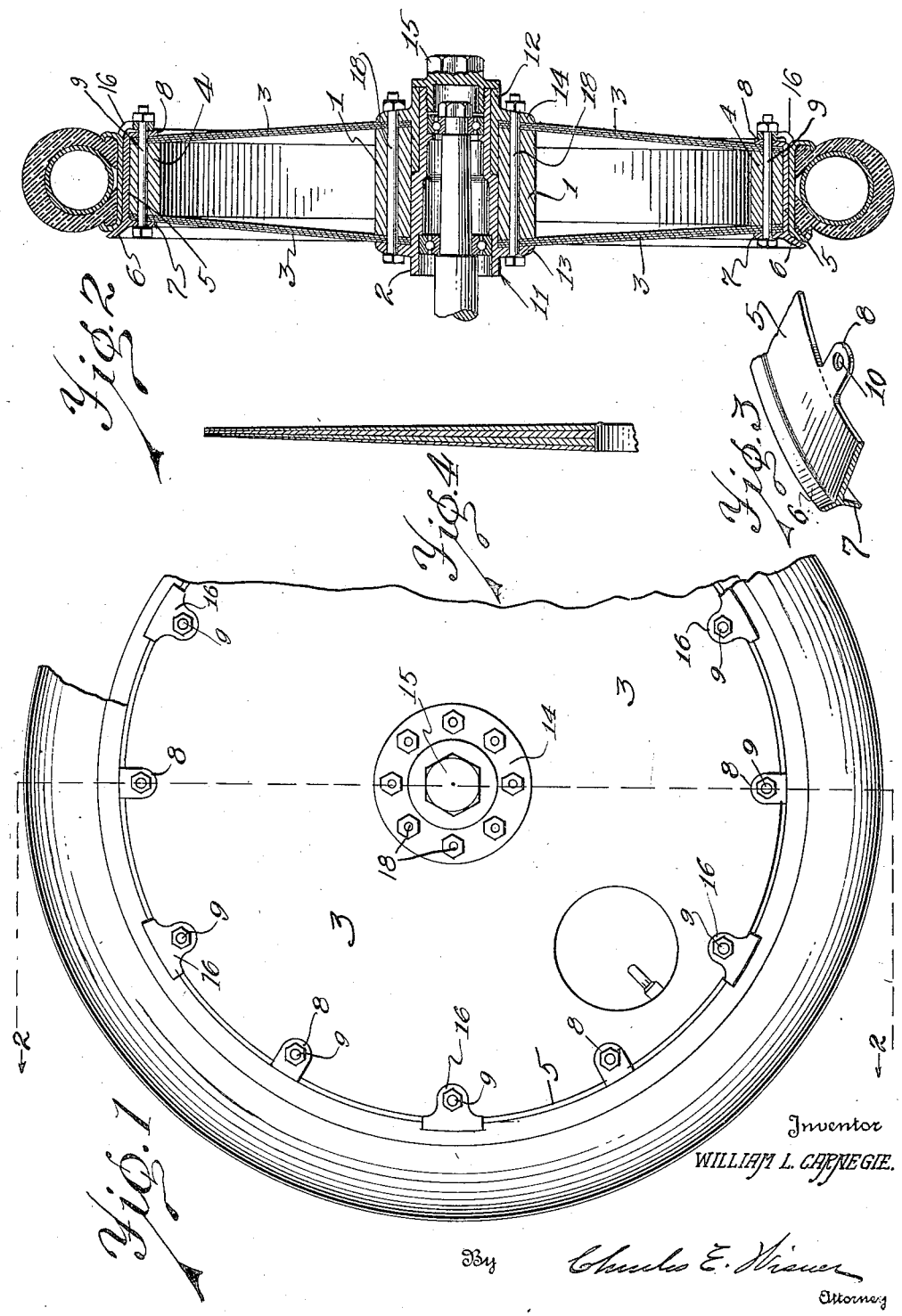
Inventor
WILLIAM L. CARNEGIE.

Patented Nov. 13, 1923.

1,473,669

UNITED STATES PATENT OFFICE.

WILLIAM L. CARNEGIE, OF DETROIT, MICHIGAN.

PLY-WOOD WHEEL.

Application filed October 27, 1919. Serial No. 333,542.

*To all whom it may concern:*

Be it known that I, WILLIAM L. CARNEGIE, a citizen of the United States, residing at Detroit, county of Wayne, State of Michigan, have invented a certain new and useful Improvement in Ply-Wood Wheels, and declare the following to be a full, clear, and exact description of the same, such as will enable others skilled in the art to which it pertains to make and use the same, reference being had to the accompanying drawings, which form a part of this specification.

This invention relates to veneer or plywood vehicle wheels and the object of the invention is to provide a wheel made of veneer wood of several plies to provide a strong and yet very light wheel. A further object of the invention is to provide a wheel of the character described formed of discs of wood veneer or plywood said discs being separated at the hub and rim by members secured thereto to which a hub and rim may be secured. A further object of the invention is a wheel of the character described formed of several discs of a multiple ply veneer which are concave in form the concave faces facing each other and the discs being secured to a spacing member at the hub and a rim spacing member at the rim providing a wheel of extreme strength and toughness and also of extremely light weight. These objects and the several novel features of the invention are hereinafter more fully described and claimed and the preferred form of construction is shown in the accompanying drawings in which:—

Fig. 1 is a side elevation of a wheel embodying my invention.

Fig. 2 is a section taken on line 2—2 of Fig. 1.

Fig. 3 is a perspective view of a portion of the metal rim illustrating the means for securing the rim to the plywood wheel.

Fig. 4 is a section through a plywood disc formed of greater thickness at the hub than at the rim to provide a wheel of greater strength.

The wheel consists of wooden member 1 shown more particularly in Fig. 2 extending circumferentially about the hub member 2 which is bolted to the member 1 by bolts as shown. Secured to this member 1 are a pair of plywood convex discs 3 which are apertured to receive the hub and which extend to the rim member 4 which is of wood and extends about the inner periphery of the said discs and to which the said discs are secured by furniture glue or other means not here shown. Supported on the rim member 4 is a metal rim 5 having an angularly extending flange 6 and a depending flange 7 having bolt holes positioned circumferentially therein. At the opposite side the rim 5 is provided with a plurality of depending lugs 8 which are spaced equidistantly about the periphery of the rim and are originally formed as shown in Fig. 3 extending in a plane with the rim face. The wheel is first made up by forming the plywood discs 3 in the shape shown which is convex or may be straight or concave as desired. The form shown in Fig. 2 being considered the most feasible to withstand greater strains both horizontal and vertical and also side thrusts and it is to be noted that the discs 3 are provided with a central aperture for the hub and are secured to the member 1 by furniture glue or other means similar to that used in securing the periphery of the discs to the wooden rim member 4. Thus the wheel when first formed consists only of the two veneered wood discs 3 spaced by the members 1 and 4. When the wheel has been made up in this form, the rim 5 is slid to position on the rim member 4 and the depending flange 7 is forced to engagement with the side of one of the discs 3. The rim is allowed to be placed on the wheel by reason of the lugs 8 extending in a plane with the face of the rim and when the rim has been correctly positioned on the rim member 4, the lugs 8 are turned over and the bolts 9 are passed through the apertures 10 in the said lugs and through the plywood discs and wooden rim member 9 and also through the apertures in the depending flange 7. When the rim is thus assembled and bolts tightened it can be seen that the rim 2, the plywood discs and the wooden rim member 4 are secured together in a solid unit especially when all of the bolts 9 have been positioned and tightened. Fitting the hub portion of the wheel is a hub casing 11 which is made in two parts, a stationary part 11 and movable part 12. In assembly I force the part 11 through the center aperture in the wheel until the flange 13 thereof engages one of the wood discs 3 and then from the other side I position the member 12 so that the flange 14 thereon engages the opposite disc 3. By turning the nut 15 in the outer end of the hub 11 the flange 14 on the hub part 12 is forced to tight engagement with the side of the wheel opposite that engaged by the flange 13. The flanges 13 and 14 on the hub members 11 and 12 are provided with apertures spaced circumferentially thereabout and the wooden hub member 1 is provided with apertures to agree with the flange apertures so that bolts 18 may be passed through the flanges 13 and 14, and the discs 3 and member 1 and the entire hub is secured together by tightening the bolt nuts about the flange so that a wheel is provided combining great strength and ease of assembly.

The rim 5 may be of any approved type and I have here illustrated the type of rim which carries an additional demountable rim for holding the tire as is the general practice. I have also formed several of the bolts of sufficient length to allow the positioning of a wedge lug 16 thereon for supporting the demountable rim and by tightening the nuts on the bolts 9 the wedge members 16 are forced to position to support the demountable rim and tire. This invention is not to be considered as useful with only this type of rim as various types of rims may be used providing however that the flanges thereon are positioned over the exterior of the veneer wood discs and the rim member is secured to the said wheel by the bolts in such a manner as to bind the component parts together and thereby further strengthen the wheel. The hub member also should be considered in the same light the hub shown being out only for illustration, the characteristics of the hub of this wheel being limited to flange members extending over the plywood discs and wood hub member and bolted to the same in such manner as to provide a wheel of extreme strength and also of extreme lightness of construction. A wooden veneer of several plies such as shown in this wheel is of extreme strength and will withstand great pressures either horizontal or vertical and in the design shown the wheel will also withstand extreme side thrusts such as produced by driving the wheel into the curb or side skidding. In Fig. 4 I have illustrated an alternative form of plywood disc which may be used if desired in place of the plywood discs shown. This plywood disc as will be noted from the figure is of greater thickness at the hub than the rim and when used in a wheel in the construction shown in Fig. 2 the use of this type of disc provides a wheel of even greater strength and strain resisting qualities than that provided by the use of discs of the same thickness throughout. It is also to be noted that the wheel is very neat in appearance and if desired may be enameled in any color to agree with the owner's taste or may be finished in natural wood finish, the finish of course varying with the type of wood used for the veneer. This wheel may also be made of several discs of plywood spaced apart at the periphery by several rim members similar to the member 4 shown in the drawing but necessarily less in width and the discs may be also spaced apart at the center by hub members similar to the member 1 and also necessarily less in width.

From the foregoing description, it becomes evident that by the construction here shown, a wheel is provided of great lightness in comparison with other wheels of this type and also of great strain resisting qualities while at the same time providing a very neat appearance.

Having thus briefly described my invention, what I claim and desire to secure by Letters Patent of the United States is—

1. In a wheel, a pair of multiple ply veneer wood disks spaced apart and together secured to a hub, a rim member spacing the disks apart at the periphery, a tire supporting member about the rim having parts engaging over the edges of the disks, and bolts extending through the disk engaging parts, disks and rim member.

2. In a wheel, a pair of multiple ply veneer wood disks apertured at the center, a centrally apertured wooden core between the disks at the center with the aperture thereof registering with the apertures of the disks, an annular rim member spacing the disks at the periphery and a hub comprising two telescoping flanged parts fitting the core with the flanges on the exterior of the disks, and bolts extending through the flanges, core and disk binding the parts together as a unit, said disks being tapered in form in cross section from the center to the periphery.

In testimony whereof I sign this specification.

WILLIAM L. CARNEGIE.